US009654967B2

(12) United States Patent
Kim et al.

(10) Patent No.: US 9,654,967 B2
(45) Date of Patent: May 16, 2017

(54) METHOD AND APPARATUS FOR PERFORMING DISCOVERY FOR DEVICE-TO-DEVICE COMMUNICATION

(71) Applicant: Samsung Electronics Co., Ltd., Suwon-si, Gyeonggi-do (KR)

(72) Inventors: Kyung-Kyu Kim, Suwon-si (KR); Young-Kyo Baek, Seoul (KR); Sang-Kyu Baek, Suwon-si (KR); Young-Bin Chang, Anyang-si (KR); Song-Yean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 14/280,013

(22) Filed: May 16, 2014

(65) Prior Publication Data
US 2014/0344578 A1    Nov. 20, 2014

(30) Foreign Application Priority Data

May 16, 2013 (KR) ........................ 10-2013-0055873

(51) Int. Cl.
*H04W 12/02* (2009.01)
*H04L 29/06* (2006.01)
(Continued)

(52) U.S. Cl.
CPC ......... *H04W 12/02* (2013.01); *H04L 63/0428* (2013.01); *H04W 8/005* (2013.01);
(Continued)

(58) Field of Classification Search
CPC ............ G06F 21/10; G06F 2221/2149; G11B 20/00297; G11B 20/00492; H04L 9/0822; H04L 9/083; H04L 9/0897; H04L 9/3263; H04L 2209/60; H04L 2463/101; H04L 2005/91364; H04L 63/0823;
(Continued)

(56) References Cited

U.S. PATENT DOCUMENTS

2004/0131185 A1* 7/2004 Kakumer ................ H04L 63/08
  380/247
2006/0062391 A1* 3/2006 Lee ........................ H04L 63/061
  380/270
(Continued)

FOREIGN PATENT DOCUMENTS

KR   2014-0102050 A    8/2014
WO   2013-029143 A1    3/2013

*Primary Examiner* — Jung Kim
*Assistant Examiner* — Tri Tran
(74) *Attorney, Agent, or Firm* — Jefferson IP Law, LLP

(57) ABSTRACT

A discovery method for Device-to-Device (D2D) communication is provided. A terminal transmits a discovery service request message for D2D communication including one of application information and group information for a Proximity based Service (ProSe) to a server. The terminal receives, from the server, a discovery service key delivery message including a discovery service key corresponding to the one of the application information and the group information for a ProSe. The terminal acquires the discovery service key by decrypting the discovery service key delivery message, and performs discovery by encrypting a discovery code with the acquired discovery service key.

17 Claims, 9 Drawing Sheets

(51) Int. Cl.
*H04W 8/00* (2009.01)
*H04W 12/04* (2009.01)
*H04L 29/08* (2006.01)
*H04W 4/20* (2009.01)

(52) U.S. Cl.
CPC ............ *H04W 12/04* (2013.01); *H04L 67/16* (2013.01); *H04W 4/206* (2013.01)

(58) Field of Classification Search
CPC ..... H04L 63/0853; H04L 9/08; H04L 9/3268; H04N 5/76
See application file for complete search history.

(56) References Cited

U.S. PATENT DOCUMENTS

| | | | |
|---|---|---|---|
| 2007/0172069 A1* | 7/2007 | Kim | G06F 21/10 380/278 |
| 2009/0327391 A1 | 12/2009 | Park et al. | |
| 2012/0163235 A1 | 6/2012 | Ho et al. | |
| 2012/0311329 A1 | 12/2012 | Medina et al. | |
| 2012/0314660 A1 | 12/2012 | Leppanen et al. | |
| 2013/0013926 A1 | 1/2013 | Hakola et al. | |
| 2014/0227997 A1 | 8/2014 | Kim et al. | |

\* cited by examiner

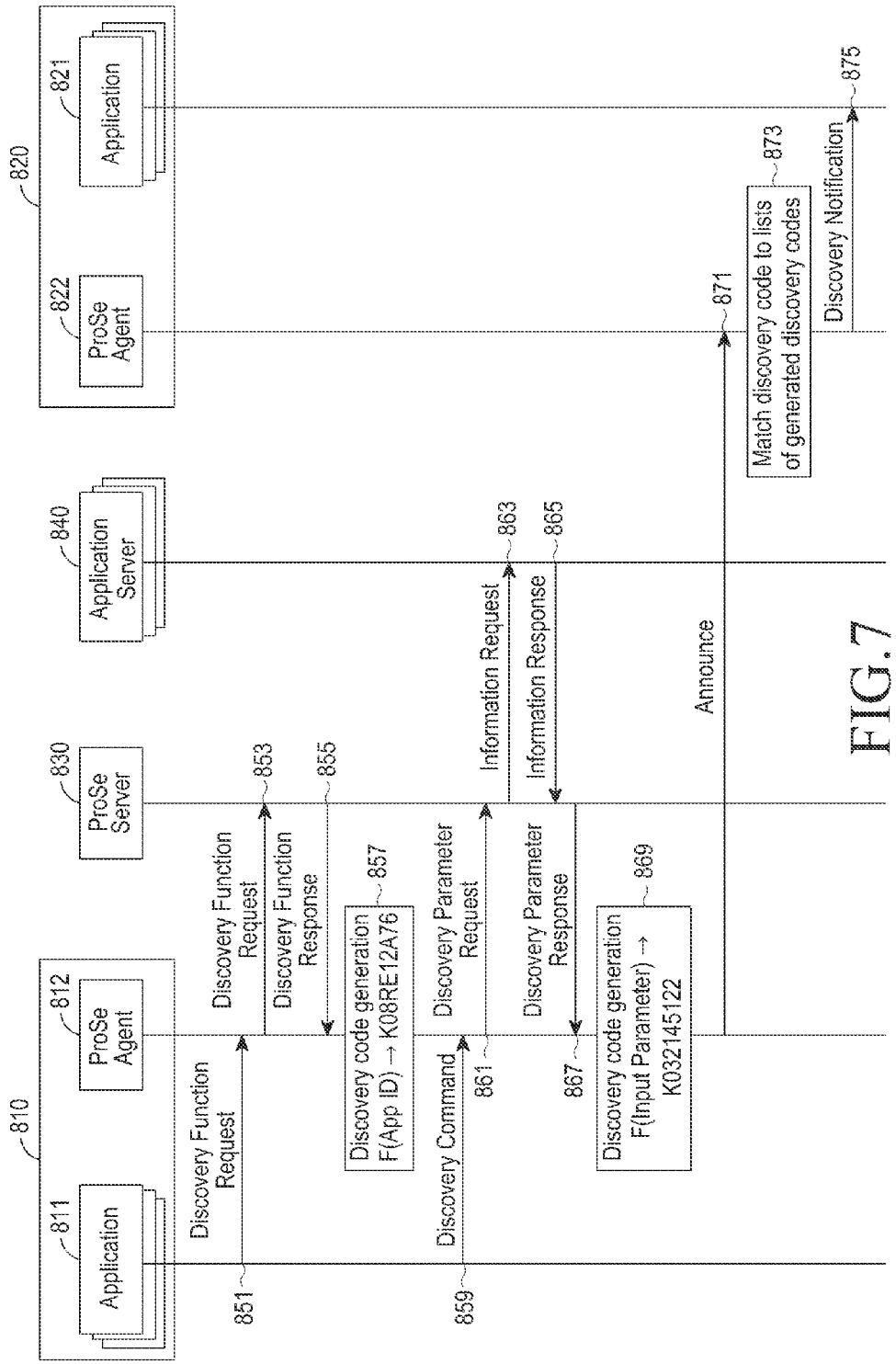

METHOD AND APPARATUS FOR PERFORMING DISCOVERY FOR DEVICE-TO-DEVICE COMMUNICATION

CROSS-REFERENCE TO RELATED APPLICATION(S)

This application claims the benefit under 35 U.S.C. §119 (a) of a Korean patent application filed in the Korean Intellectual Property Office on May 16, 2013 and assigned Serial number 10-2013-0055873, the entire disclosure of which is hereby incorporated by reference.

TECHNICAL FIELD

The present disclosure relates to Device-to-Device (D2D) communication. More particularly, the present disclosure relates to a discovery method and apparatus for D2D communication in a wireless communication system.

BACKGROUND

Device-to-Device (D2D) communication or Peer-to-Peer (P2P) communication refers to a communication service that is made via a communication link that is directly formed between terminals (also known as User Equipments (UEs)) without a network entity such as a base station (also known as an enhanced Node B (eNB)), an access point and the like.

A terminal supporting the D2D communication service may acquire synchronization with its nearby terminals and discover the nearby terminals using the predetermined timing and resources, thereby obtaining terminal information and service information for at least one nearby terminal. The terminal information may include identification information, interest information, application information and the like, for the terminal.

The D2D communication service may interwork with the cellular-based mobile communication, wireless communication or broadband communication system. A terminal supporting the D2D communication service may discover its nearby terminals using the timing and resources set by the base station of the mobile communication system, while using the same frequency band as that allocated to the mobile communication system. The terminal may access a network and receive a lot of support needed for the D2D communication service, such as authentication, security and the like.

In order to use the D2D communication service, security should be set between terminals. According to the related art, with the help of the network, a pre-shared secret key and security algorithm and an IDentifier (ID) of a terminal may be exchanged between terminals desiring to perform D2D communication. The information and algorithm exchanged may be delivered not by a D2D communication channel, but by a secured communication channel which is used for related-art communication such as a $3^{rd}$ Generation (3G) network, a Long Term Evolution (LTE) network or the like.

The related-art communication system (e.g., the LTE system) may include Non-Access-Stratum (NAS) security between a UE and a Mobile Management Entity (MME), and Access-Stratum (AS) security between a UE and an eNB. Since every UE has its unique security key between the MME and the eNB, the security key may not be used for D2D communication. In other words, UEs may not share the security key because the UEs cannot decrypt encryption of each other and cannot trust each other.

In order to overcome these and other problems, application-based ID and key information may be delivered not through the D2D communication, but through another network (e.g., LTE). However, according to the Proximity based Services (ProSe) requirement documents, if a UE uses an ID, which is used in LTE, in D2D communication, a security policy should be adopted, a level of which is equivalent to that of the LTE system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for generating a discovery code in Device-to-Device (D2D) communication.

Another aspect of the present disclosure is to provide a method and apparatus for generating and distributing a security key, which can be used for D2D communication while satisfying the security level equivalent to that of the broadband wireless access system.

Another aspect of the present disclosure is to provide a method and apparatus for allowing discovery between terminals having the same discovery information in D2D communication.

Another aspect of the present disclosure is to provide a method and apparatus for minimizing the control overhead of a network when allowing discovery between terminals having the same discovery information in D2D communication.

In accordance with an aspect of the present disclosure, a discovery method for D2D communication is provided. The method includes transmitting, by a terminal, a discovery service request message for D2D communication including one of application information and group information for a Proximity based Service (ProSe) to a server, receiving, from the server, a discovery service key delivery message including a discovery service key corresponding to the one of the application information and the group information for a ProSe, acquiring the discovery service key by decrypting the discovery service key delivery message, and performing discovery by encrypting a discovery code with the acquired discovery service key.

In accordance with another aspect of the present disclosure, a terminal for performing discovery for D2D communication is provided. The terminal includes an application area that includes a plurality of applications and is configured to transmit a discovery request message for D2D communication, a ProSe agent configured to transmit one of application information and group information for a ProSe to a server using the discovery request message, acquire a discovery service key from the server, and transmit a discovery command message, and a modem configured to transmit a discovery service request message to the server upon receiving the discovery request message from the ProSe agent, receive from the server a discovery service key delivery message including a discovery service key corresponding to the one of the application information and the group information for a ProSe, acquire the discovery service key by decrypting the discovery service key delivery message, and perform discovery by encrypting a discovery code with the acquired discovery service key according to a discovery command of the ProSe agent.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 illustrates a code allocation method for allowing discovery between D2D UEs having the same discovery information according to an embodiment of the present disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A description will now be made of a method for generating and distributing a security key used for Device-to-Device (D2D) communication in a cellular-based broadband mobile communication system. Although a Long-Term Evolution (LTE) system will be considered as an example of the broadband wireless access system in the present disclosure, it will be apparent to those of ordinary skill in the art that the technology of the present disclosure may be applied to any type of system that requires message exchange between an access network and a terminal.

Figure 1:
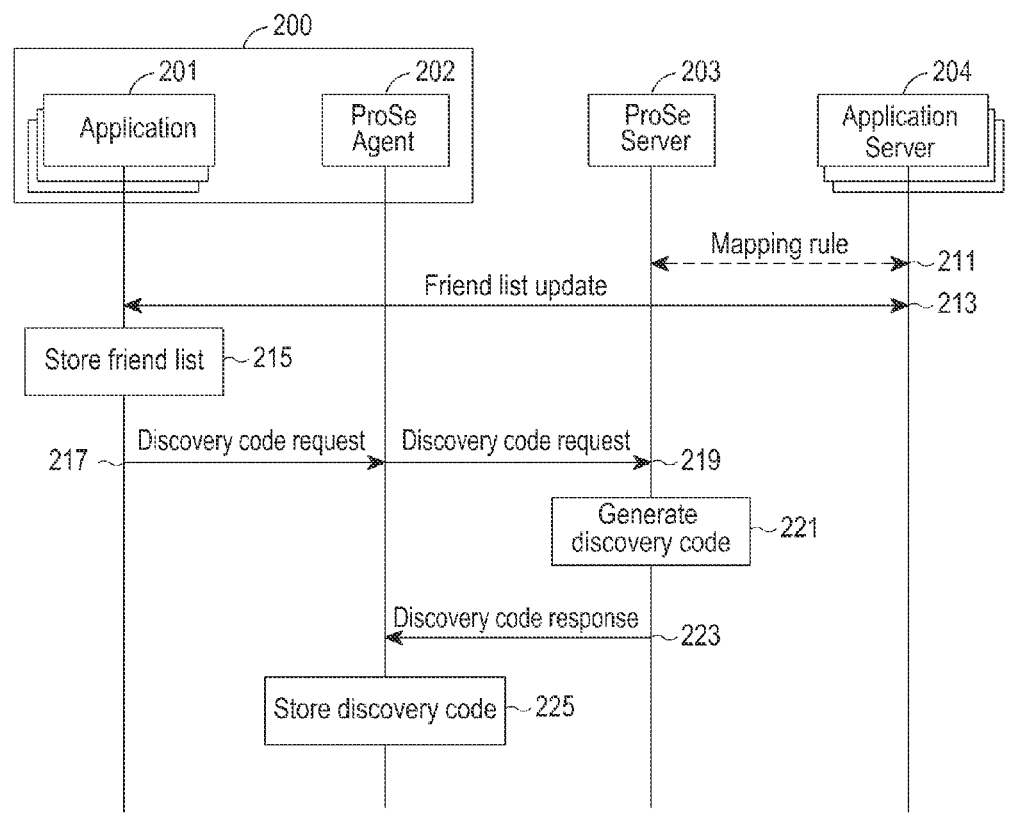
FIG. 1 illustrates a procedure for allocating a discovery information code for a Device-to-Device (D2D) User Equipment (UE) according to an embodiment of the present disclosure.

FIG. 1 illustrates a procedure for allocating a discovery information code for a D2D User Equipment (UE) according to an embodiment of the present disclosure.

The UE 200 may include an application area 201 in which multiple applications exist, and a Proximity based Service (ProSe) agent 202. The application area 201 may be an end point for receiving a command from a user through a user interface and executing the command. A signal generated in the application area 201 may be delivered to the ProSe agent 202, in which the signal may be converted into a format that can be used for a broadband communication protocol. The ProSe agent 202 may include a middleware located in the middle of the broadband communication protocol with the application area 201.

In operation 211, a ProSe server 203 and an application server 204 may exchange a mapping rule for allocating a code, with each other, and may update the mapping rule periodically or upon the occurrence of an event. By exchanging the mapping rule, the ProSe server 203 may collect information of each application, and allocate a code using the collected information. The application server 204 may communicate with the application area 201 of the UE 200, and update the information periodically or upon the occurrence of an event. By sharing the information between the application server 204 and the UE 200, information between the ProSe server 203 and the UE 200 may be synchronized. In FIG. 1, a friend list may be periodically checked and updated as an example of the information in operation 213. Thereafter, in operation 215, the application area 201 of the UE 200 may store the updated friend list in a storage space. If a discovery command is generated in the application area 201, the UE 200 may request help from the ProSe server 203 to obtain information for discovering a nearby UE.

In operation 217, the application area 201 may transmit, to the ProSe agent 202, a discovery code request message that includes an application IDentifier (ID) and a friend list including an ID of the application area 201. In operation 219, the ProSe agent 202 may check the application ID included in the discovery code request message, and request allocation of a discovery code by transmitting the discovery code request message to the ProSe server 203. In operation 221, the ProSe server 203 may receive the discovery code request message and generate a discovery code 'My app ID=40I0SFAKDJ' indicating the ProSe server 203 using the application ID. In operation 223, the ProSe server 203 may determine whether a UE that is using ProSe discovery or that desires to use ProSe discovery is currently present within the management range of the ProSe server 203 in the friend list included in the received message, and if the UE is present, the ProSe server 203 may transmit the discovery code 'My app ID=40I0SFAKDJ' of the ProSe server 203 and the UE's discovery code to the ProSe agent 202, using a discovery code response message. In operation 225, upon receiving the discovery code response message, the ProSe agent 202 may store the discovery codes included in the message. The stored discovery codes may be used when the ProSe agent 202 discovers another UE or informs the ProSe agent 202, during the discovery.

Figure 2:
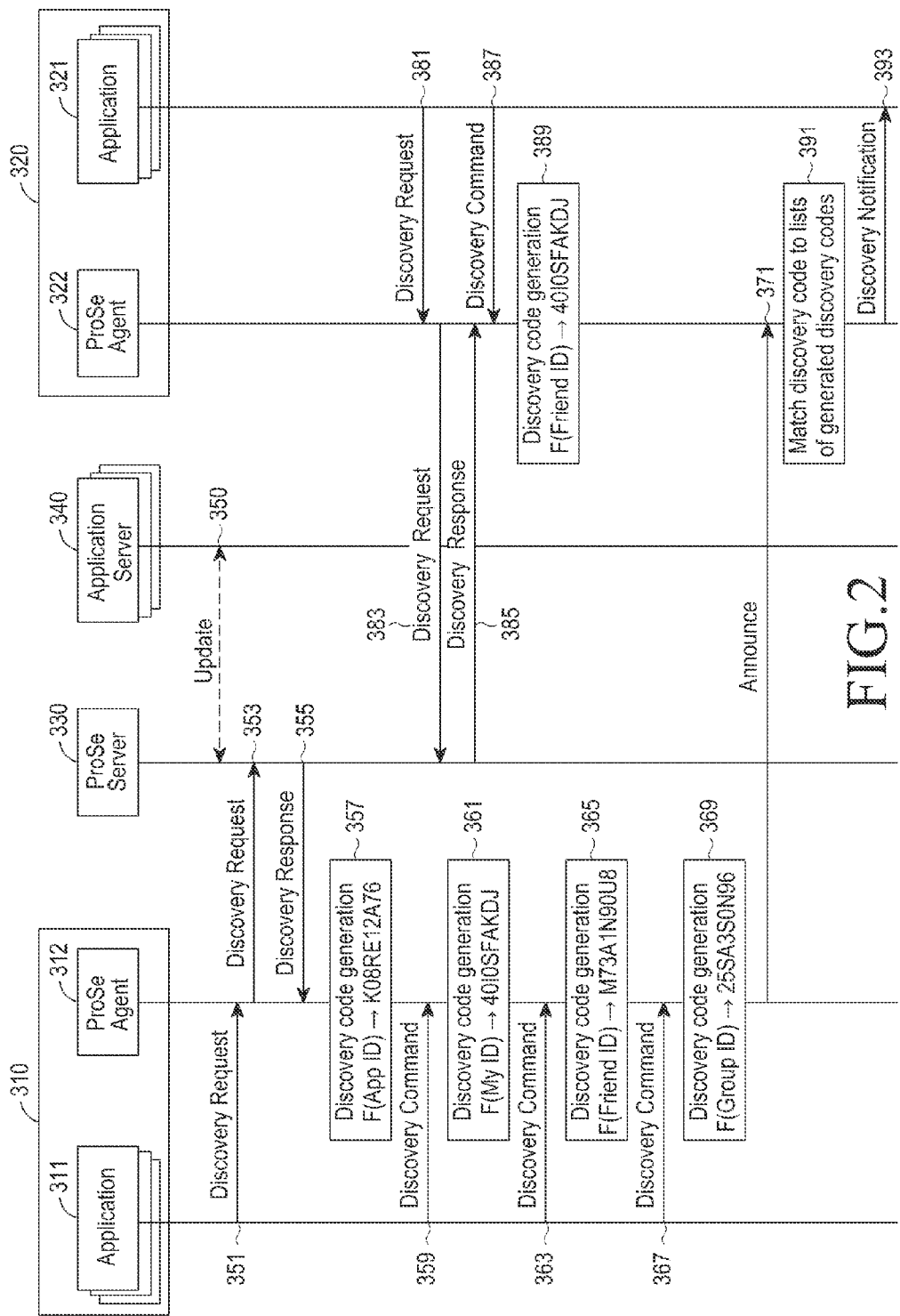
FIG. 2 illustrates a code allocation method for allowing discovery between D2D UEs having the same discovery information according to an embodiment of the present disclosure.

FIG. 2 illustrates a code allocation method for allowing discovery between D2D UEs having the same discovery information according to an embodiment of the present disclosure.

Referring to FIG. 2, in operation 350, an application server 340 may perform an update operation with a ProSe server 330. In operation 351, an application area 311 of a UE 310 may deliver application information, such as an ID of an authorized application downloaded from an operator (not shown), to a ProSe agent 312 using a discovery request message, to prepare to make a code needed for discovery. It will be assumed that an application has been created by a content provider, and then authorized and registered by the operator. The operator may assign an ID to the registered application and manage the application.

In operation 353, the ProSe agent 312 may transmit a discovery request message to the ProSe server 330 to receive a code for discovery. The discovery request message may include an application ID. Thereafter, the ProSe server 330 may determine the validity of the application ID by verifying the application ID with the UE 310. If the application ID is valid, the ProSe server 330 may allocate the function 'Function F( )' that the application uses for discovery, and transmit the allocated function to the UE 310 using a discovery response message, in operation 355. As an example, each of all applications may share the function for generating a discovery code, and the function may be under management of the operator. As another example, all applications may have one function, and the function may be under management of the operator. Upon receiving the function, the ProSe agent 312 of the UE 310 may generate a discovery code 'K08RE12A76' by inserting an ID of the application that transmitted the discovery request message, into the function in operation 357. If the generated discovery code is used, UEs that use the same function and the same application may obtain application ID information by decrypting the discovery code.

Thereafter, the application area 311 may generate a code containing desired information by inserting the unique information. As an example, if only the people knowing an ID of the application area 311 desire to listen to a discovery signal of the application area 311, the application area 311 may insert its own ID 'My ID' information into a discovery command message and send the discovery command message in operation 359, and the ProSe agent 312 may generate a new discovery code '40ISFAKDJ' by inserting the 'My ID' information into Function F( ) in operation 361. As another example, when finding a friend, the application area 311 may insert the friend's ID 'Friend ID' into a discovery command message and send the discovery command message in operation 363, and the ProSe agent 312 may generate a new discovery code 'M73A1N90U8' by inserting the 'Friend ID' information into Function F( ) in operation 365. As yet another example, when desiring to find a group, the application area 311 may insert a group ID into a discovery command message and send the discovery command message in operation 367, and the ProSe agent 312 may generate a new discovery code '25SA3S0N96' by inserting the group ID into Function F( ) in operation 369. Although only one type of information is used as an input of a discovery code generation function in the above examples, multiple types of information may be used. The above function may be an irreversible function that uses the resulting values. In other words, although a UE having the same information may make a discovery code by inserting the same input value, the UE may not obtain information about an input value even though the UE has a discovery code and a function.

If the generation of a discovery code is completed in the ProSe agent 312 of the UE 310 through this process, the ProSe agent 312 may participate in a discovery procedure by broadcasting the generated discovery code to nearby UEs in operation 371.

Even a ProSe agent 322 of a UE 320, like the ProSe agent 312 of the UE 310, may receive an application ID from an application area 321 using a discovery request message, the ProSe server 330 may determine the validity of the application ID by verifying the application ID, and the ProSe agent 322 may receive a discovery code function from the ProSe server 330, in operations 381 to 385. Thereafter, as an example, if a command desiring to find a friend is transmitted to the ProSe agent 322 together with Friend ID using a discovery command message from the application area 321 in operation 387, the ProSe agent 322 may generate a discovery code '40I0SFAKDJ' by inputting Friend ID to Function F( ), and then store the generated discovery code in operation 389. One or more discovery code lists may be made depending on the requirements of the application area. Thereafter, the ProSe agent 322 of the UE 320 may participate in the discovery procedure and listen to a discovery code from a nearby UE in operation 371. If the ProSe agent 322 finds a discovery code matching the discovery code included in the discovery code list stored therein in operation 391, the ProSe agent 322 may notify the application area 321 that the discovery codes are matched, using a match notification message in operation 393.

The discovery code generation function described in the first embodiment of the present disclosure may be a medium for keeping the security from another UE having heterogeneous information. Therefore, a second embodiment of the present disclosure may provide a method of using a discovery code generation function for distribution of a security key.

Figure 3A:
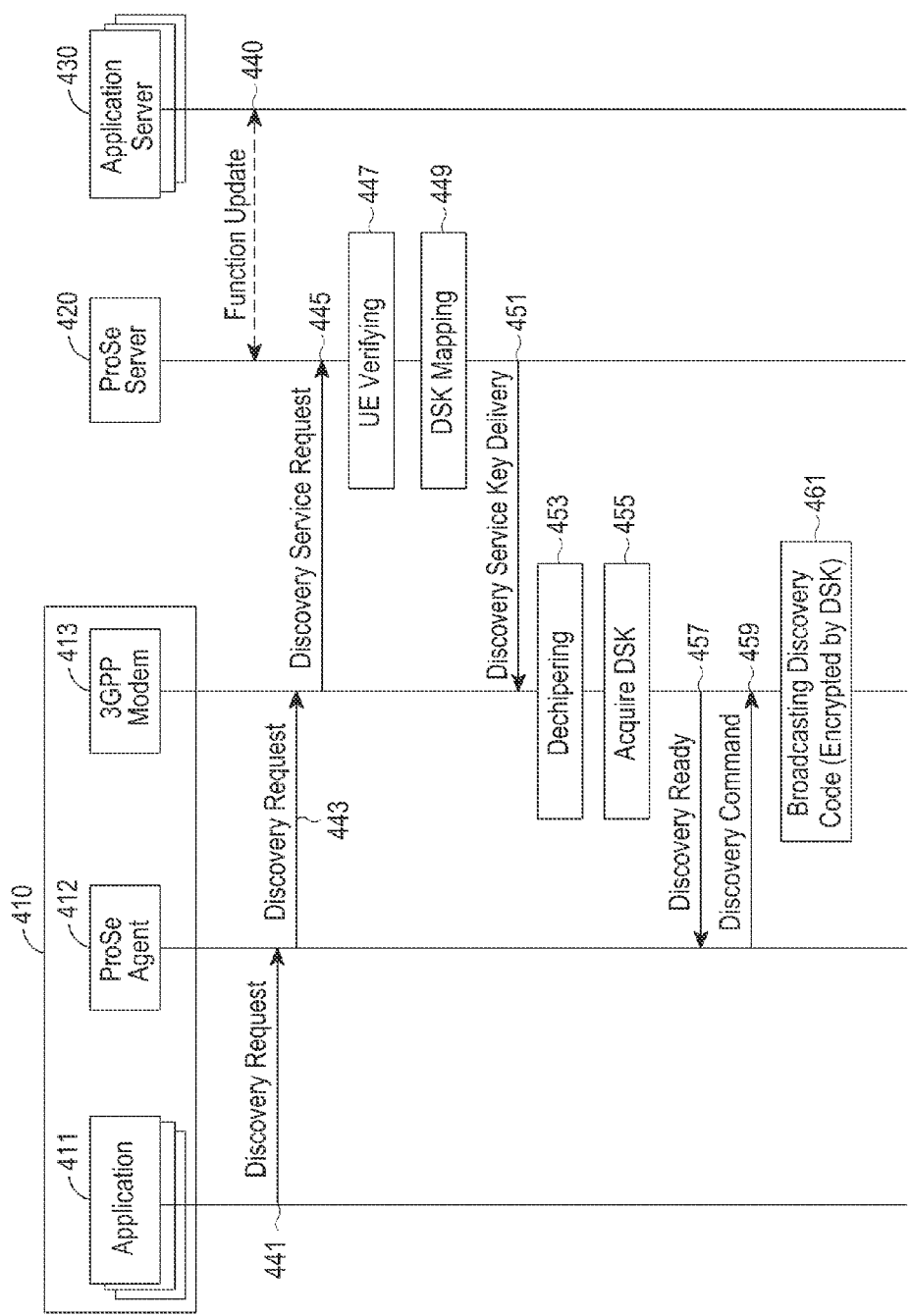
FIGS. 3A and 3B illustrate a security key distribution method for allowing discovery between D2D UEs having the same discovery information according to an embodiment of the present disclosure.
Figure 3B:
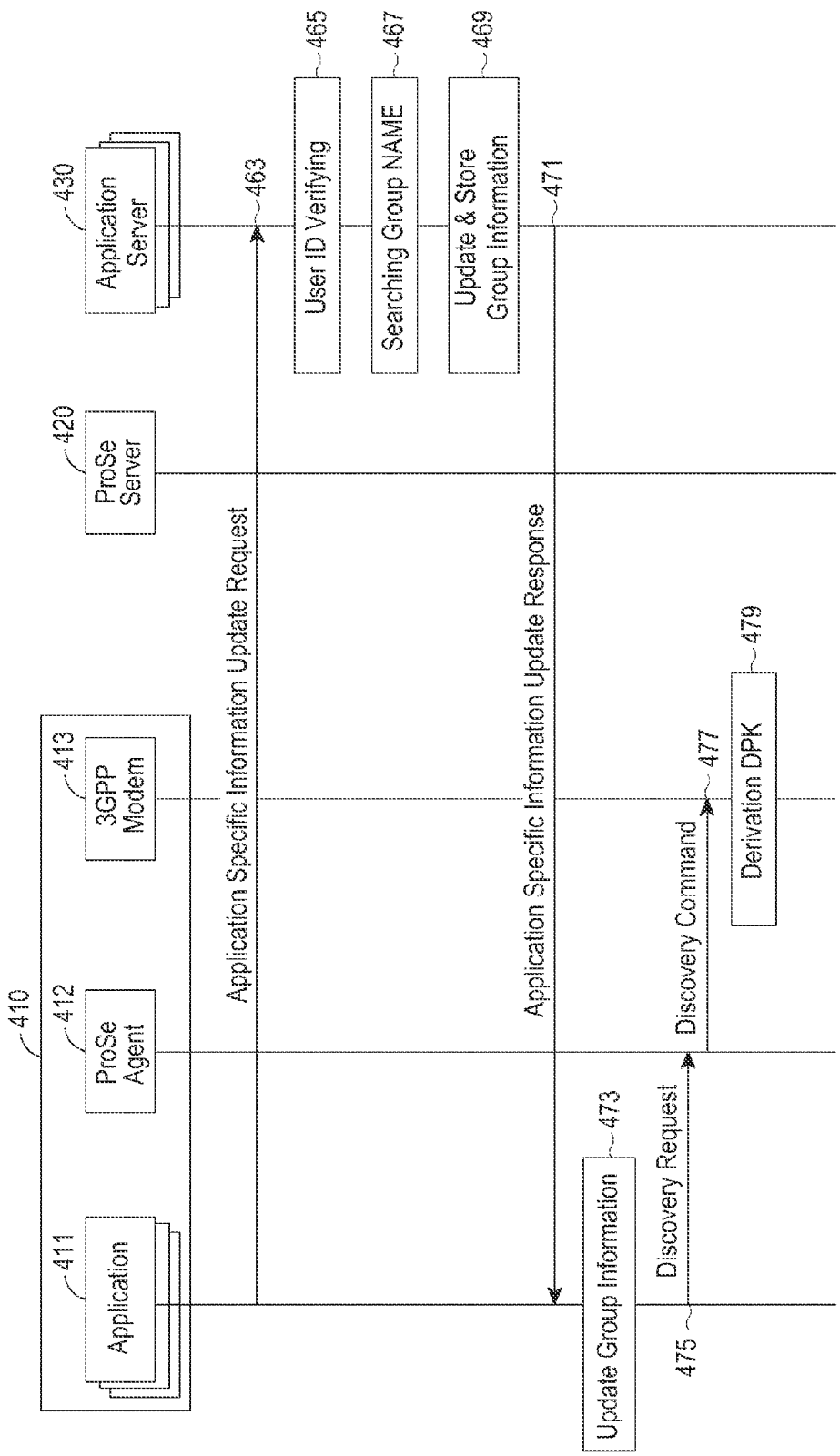

FIGS. 3A and 3B illustrate a security key distribution method for allowing discovery between D2D UEs having the same discovery information according to an embodiment of the present disclosure.

Referring to FIGS. 3A and 3B, a D2D UE 410 may include an application area 411 in which multiple applications exist, a ProSe agent area 412, and a 3rd Generation Partnership Program (3GPP) modem area 413. The application area 411 may be an end point for receiving a command from a user through a user interface and executing the command. A signal generated in the application area 411 may be delivered to the ProSe agent 412, in which the signal may be converted into a format that can be used for a broadband communication protocol. The ProSe agent 412 may include a middleware located in the middle of the broadband communication protocol with the application area 411. The 3GPP modem area 413 may be an area that actually transmits a signal to the network according to the protocol of the broadband network.

In operation 440, an application server 430 may perform an update operation with a ProSe server 420. The ProSe agent 412 may receive a discovery request message that is generated in the application area 411 of the UE 410, in operation 441, and the ProSe agent 412 may transmit application information (e.g., application ID) included in the received message to the 3GPP modem area 413. As an example, the application area 411 of the UE 410 may deliver an ID of an authorized application downloaded from an operator (not shown), to the ProSe agent 412, to prepare to make a code needed for discovery in operation 443. It will be assumed that an application has been created by a content provider, and then authorized and registered by the operator. The operator may assign an ID to the registered application and manage the application. The ProSe agent 412 may transmit the application ID to the 3GPP modem area 413 by including the application ID in the discovery request message received from the application area 411, and the 3GPP modem area 413 may request a key by delivering the application ID to the ProSe server 420 using a discovery service request message in operation 445. The 3GPP modem area 413 may deliver a ProSe group ID that has been set in advance during service subscription and stored in an International Mobile Station Identity (IMSI), to the ProSe server 420 using the discovery service request message. The ProSe group ID, which is an ID used to identify a transmission group in a ProSe area, may be referred to as a D2D group ID. As an example, it will be assumed that the 3GPP modem 413 and the ProSe server 420 have been registered in the network after finishing an initial access procedure of 3GPP LTE, and Access-Stratum (AS) and Non-Access-Stratum (NAS) channels are secure. As another example, secure channels such as Generic Bootstrapping Architecture (GBA) or Transport Layer Security (TSL) may be used. Upon receiving the discovery service request message, the ProSe server 420 may check the validity of the application ID with the UE 410 in operation 447, and if the application ID is valid, the ProSe server 420 may determine a Discovery Service secret Key (DSK) that is assigned during application registration, in operation 449, and deliver the DSK to the UE 410 using a discovery service key delivery message in operation 451. The ProSe server 420 may check the validity of a 3GPP ID of the UE 410 by means of a 3GPP entity (e.g., Home Subscriber Server (HSS)). The DSK may be periodically changed, and managed under management of the operator. A different DSK or the same DSK may be allocated to each application, and, one DSK may be allocated, which can be used by all UEs that have subscribed to the D2D service. The discovery service key delivery message may be transmitted by being encrypted in the AS or NAS security manner, or in the above-described another manner. For example, the discovery service key delivery message may be directly transmitted from the UE 410 to the ProSe server 420 through an Internet Protocol (IP) layer using a PC3 interface that directly connects the 3GPP modem 413 of the UE 410 to the ProSe server 420.

The 3GPP modem 413 of the UE 410 may receive the discovery service key delivery message, decrypt the received discovery service key delivery message, and then acquire a DSK in operations 453 and 455. Thereafter, in operation 457, the 3GPP modem 413 may notify its acquisition of the DSK by transmitting a discovery ready message to the ProSe agent 412. If discovery information that all users using the application are allowed to listen to is transmitted, the discovery information may be encrypted using only the DSK. In other words, if the ProSe agent 412 gives an open discovery command in a discovery command in operation 459, the 3GPP modem area 413 may encrypt a discovery code with the DSK and broadcast the encrypted discovery code in operation 461.

The application area 411 may perform application-specific information update periodically or upon the occurrence of an event. In other words, the application area 411 may perform the update mainly when new information is inserted/deleted/changed for each application, and the update may be first started by the UE 410, or by the application server 430. In the example of FIGS. 3A and 3B, if a member of a group of the UE 410 is added/deleted/changed in the UE 410, information update therefor may be requested. In other words, if the UE 410 transmits an application-specific information update request message to the application server 430 in operation 463, the application server 430, upon receiving the request, may check the validity of a user ID in operation 465, search for a name of a group to which a member is to be added in operation 467, register an ID or a name of the requested member in the application server 430 in operation 469, and then transmit an application-specific information update response message to the application area 411 of the UE 410 in operation 471. Information synchronization may be performed by updating the information by transmitting a push message to other registered members in the group.

Thereafter, if the application area 411 of the UE 410 desires to discover a UE belonging to a specific group in the application or having the same information in operation 473, the application area 411 may transmit a discovery request message to the ProSe agent 412 in operation 475, and the ProSe agent 412 may transmit a group ID to the 3GPP modem 413 by inserting the group ID in a discovery command message in operation 477. The 3GPP modem 413 derivate a Discovery Private Key (DPK) using the information and DSK included in the discovery command message, and other random input values, in operation 479. As an example, the 3GPP modem 413 may derive a DSK as a DPK using a security algorithm that is specified by defining a group ID received from the ProSe agent 412 as an input value and adding a time-varying random number. Thereafter, the 3GPP modem 413 may encrypt a signal for discovering UEs that share the same information, using the DPK, and transmit the encrypted signal.

In this way, the UEs having the same information may acquire the same DSK, and the DPK made by using the same information as an input may be used for encryption, so a code encrypted with the encryption key may be analyzed.

Figure 4A:
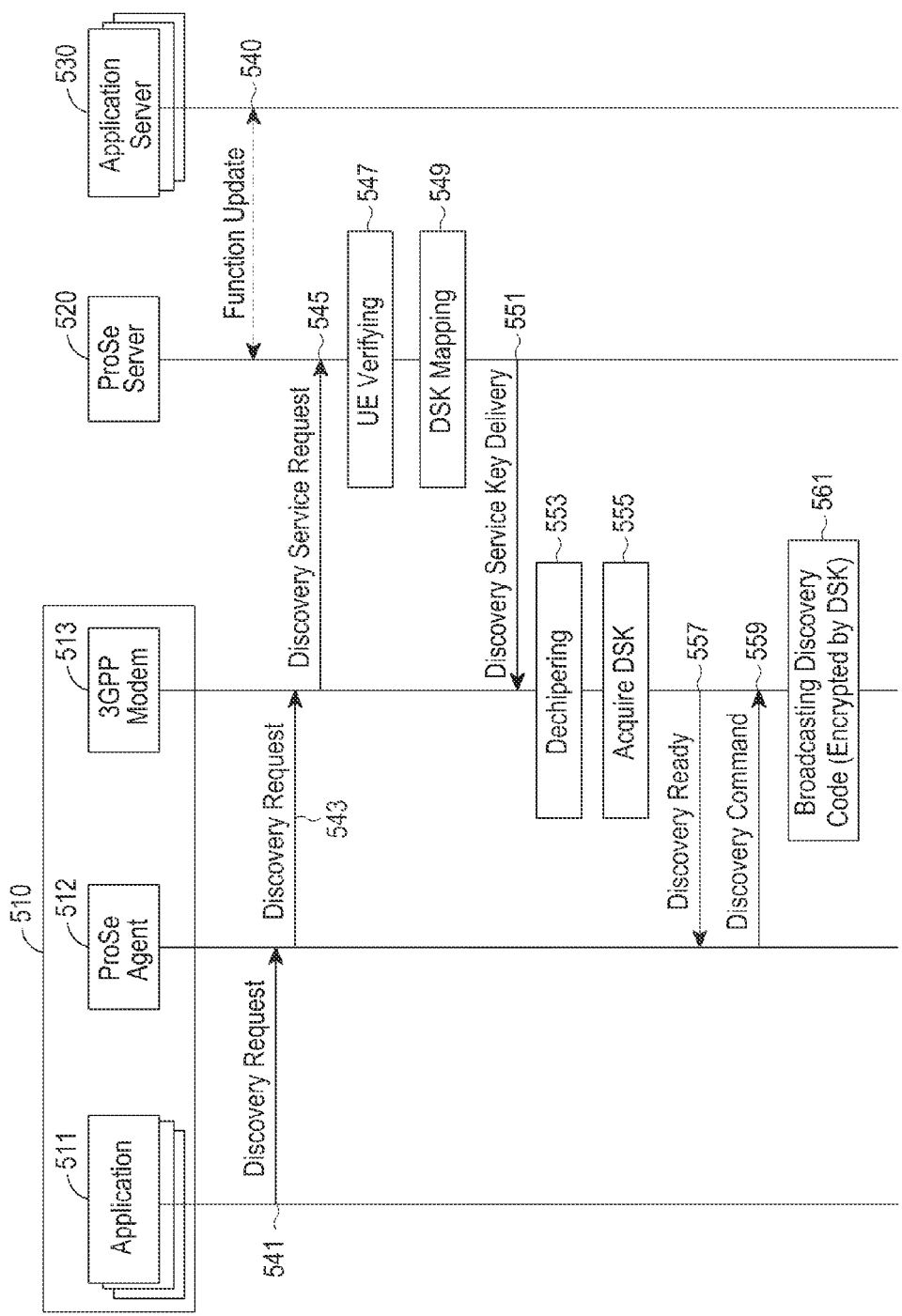
FIGS. 4A and 4B illustrate a security key distribution method for allowing discovery between D2D UEs having the same discovery information according to an embodiment of the present disclosure.
Figure 4B:
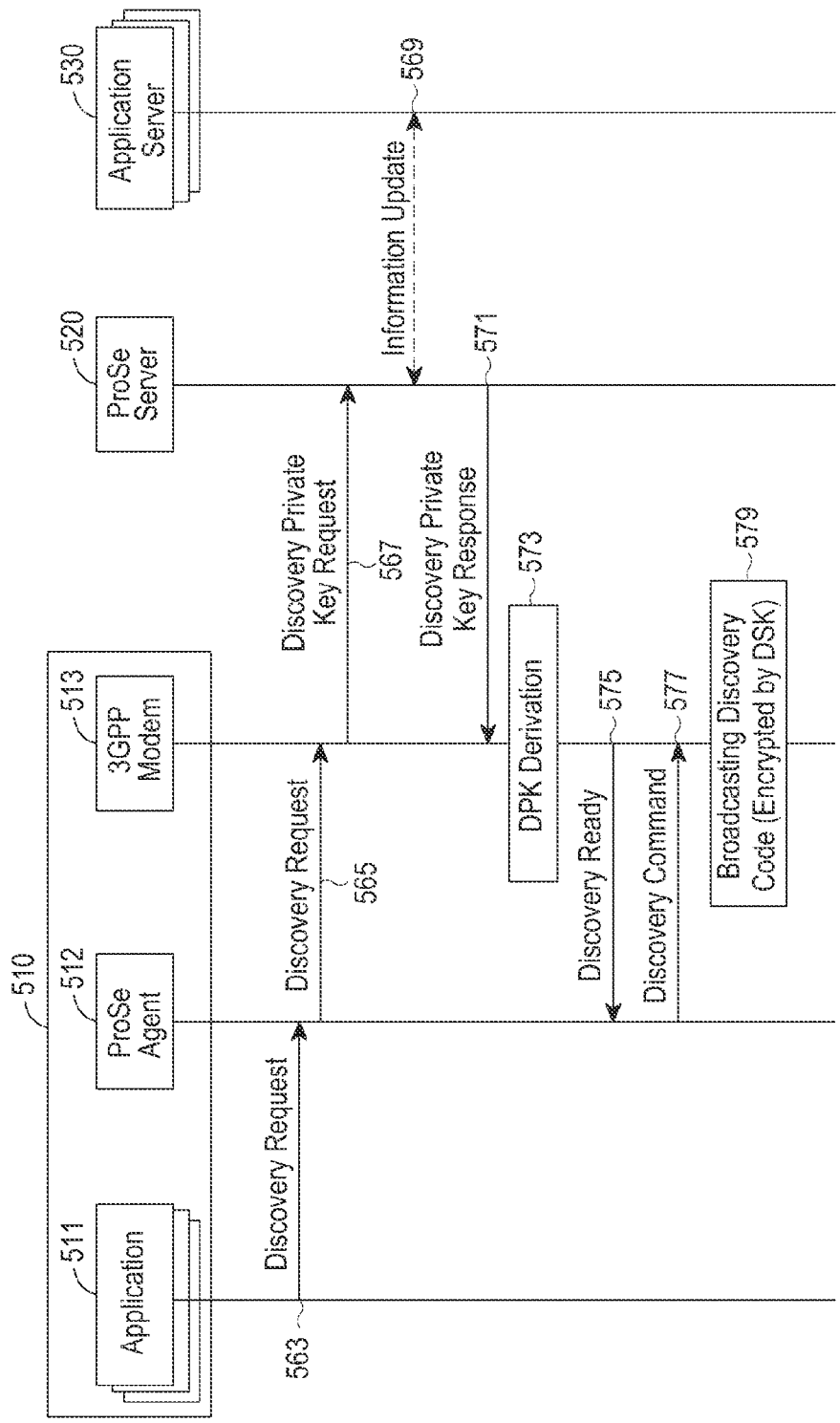

FIGS. 4A and 4B illustrate a security key distribution method for allowing discovery between D2D UEs having the same discovery information according to an embodiment of the present disclosure.

Referring to FIGS. 4A and 4B, a D2D UE 510 may include an application area 511 in which multiple applications exist, a ProSe agent area 512, and a 3GPP modem area 513. The application area 511 may be an end point for receiving a command from a user through a user interface and executing the command. A signal generated in the application area 511 may be delivered to the ProSe agent 512, in which the signal may be converted into a format that can be used for a broadband communication protocol. The ProSe agent 512 may include a middleware located in the middle of the broadband communication protocol with the application area 511. The 3GPP modem area 513 may be an area that actually transmits a signal to the network according to the protocol of the broadband network.

In operation 540, an application server 530 may perform an update operation with a ProSe server 520. The ProSe agent 512 may receive a discovery request message that is generated in the application area 511 of the UE 510, in operation 541, and the ProSe agent 512 may transmit application information (e.g., application ID) included in the received message to the 3GPP modem area 513. As an example, the application area 511 of the UE 510 may deliver an ID of an authorized application downloaded from an operator (not shown), to the ProSe agent 512, to prepare to make a code needed for discovery in operation 543. It will be assumed that an application has been created by a content provider, and then authorized and registered by the operator. The operator may assign an ID to the registered application and manage the application. The ProSe agent 512 may transmit the application ID to the 3GPP modem area 513 by including the application ID in the discovery request message received from the application area 511, and the 3GPP modem area 513 may request a key by delivering the application ID to the ProSe server 520 using a discovery service request message in operation 545. The 3GPP modem area 513 may deliver a ProSe group ID that has been set in advance during service subscription and stored in an IMSI, to the ProSe server 520 using the discovery service request message. As an example, it will be assumed that the 3GPP modem 513 and the ProSe server 520 have been registered in the network after finishing an initial access procedure of 3GPP LTE, and AS and NAS channels are secure. As another example, secure channels such as GBA or TSL may be used. Upon receiving the discovery service request message, the ProSe server 520 may check the validity of the application ID with the UE 510 in operation 547, and if the application ID is valid, the ProSe server 520 may determine a Discovery Service secret Key (DSK) that is assigned during application registration, in operation 549, and deliver the DSK to the UE 510 using a discovery service key delivery message in operation 551. The ProSe server 520 may check the validity of a 3GPP ID of the UE 510 by means of a 3GPP entity (e.g., HSS). The DSK may be periodically changed, and managed under management of the operator. A different DSK or the same DSK may be allocated to each application, and, one DSK may be allocated, which can be used by all UEs that have subscribed to the D2D service. The discovery service key delivery message may be transmitted by being encrypted in the AS or NAS security manner, or in the above-described another manner. For example, the discovery service key delivery message may be directly transmitted from the UE 510 to the ProSe server 520 through an IP layer using a PC3 interface that directly connects the 3GPP modem 513 of the UE 510 to the ProSe server 520.

The 3GPP modem 513 of the UE 510 may receive the discovery service key delivery message, decrypt the received discovery service key delivery message, and then acquire a DSK in operations 553 and 555. Thereafter, in operation 557, the 3GPP modem 513 may notify its acquisition of the DSK by transmitting a discovery ready message to the ProSe agent 512. If discovery information that all users using the application are allowed to listen to is transmitted, the discovery information may be encrypted using only the DSK. In other words, if the ProSe agent 512 gives an open discovery command in a discovery command in operation 559, the 3GPP modem area 513 may encrypt a discovery code with the DSK and broadcast the encrypted discovery code in operation 561.

If a discovery request is generated in the application area 511 by being limited to the information associated with a specific application, and then delivered to the ProSe agent 512 in operation 563, the ProSe agent 512 may attempt generation of a new discovery security key using the information received from the application area 511. As an example, the information associated with a specific application may be a group ID, and the ProSe agent 512 may deliver a discovery request message including the group ID to the 3GPP modem 513 in operation 565. Upon receiving the associated information, the 3GPP modem 513 may perform an operation of obtaining information about an input value for making a key to be used for the discovery for specific information.

First, the 3GPP modem 513 may transmit a DPK request message to the ProSe server 520 in operation 567. The DPK request message may include application-specific information such as a group ID and information for determining the validity of the UE. In addition, the DPK request message may have the security equivalent to that of the 3GPP layer, and its security may be achieved through 3GPP AS and NAS channels or TSL and GBA channels. The ProSe server 520 may check the validity of the UE, and deliver the application-specific information to the application server 530 to determine the validity of the information. Upon receiving the request to determine the validity of the information, the application server 530 may check the validity based on the user ID, update the requested information, and perform information synchronization with the UE. As an example, if a group member is added, the application server 530, which manages a group name or a group number, may perform information synchronization by registering an ID or a name of the added member and allowing other registered members in the group to update the information using a push message. Thereafter, in operation 569, the application server 520 may provide the updated information to the ProSe server 520, completing the information update process.

Thereafter, the ProSe server 520 may transmit an input value to be used for generating a key to the 3GPP modem 513 using a DPK response message in operation 571. The input value may be application information that is processed by the ProSe server 520.

In operation 573, the 3GPP modem 513 may derive a DPK using the previously received information and DSK, other random input values, and application information received from the ProSe server 520. As an example, the 3GPP modem 513 may derive a DSK as a DPK using a security algorithm that is specified by defining a group ID received from the ProSe agent 512 as an input value and adding a time-varying random number. Thereafter, in operation 575, the 3GPP modem 513 may transmit a discovery ready message to the ProSe agent 512. In operation 577, the ProSe agent 512 may transmit a discovery command to the 3GPP modem 513. In operation 579, the 3GPP modem 513 may encrypt a signal for discovering UEs that share the same information, using the derived DPK, and transmit the encrypted signal. UEs having the same information may acquire the same DSK, and use a DPK that is made of the same information as an input, so the UEs may decrypt the code encrypted with the encryption key.

Figure 5:
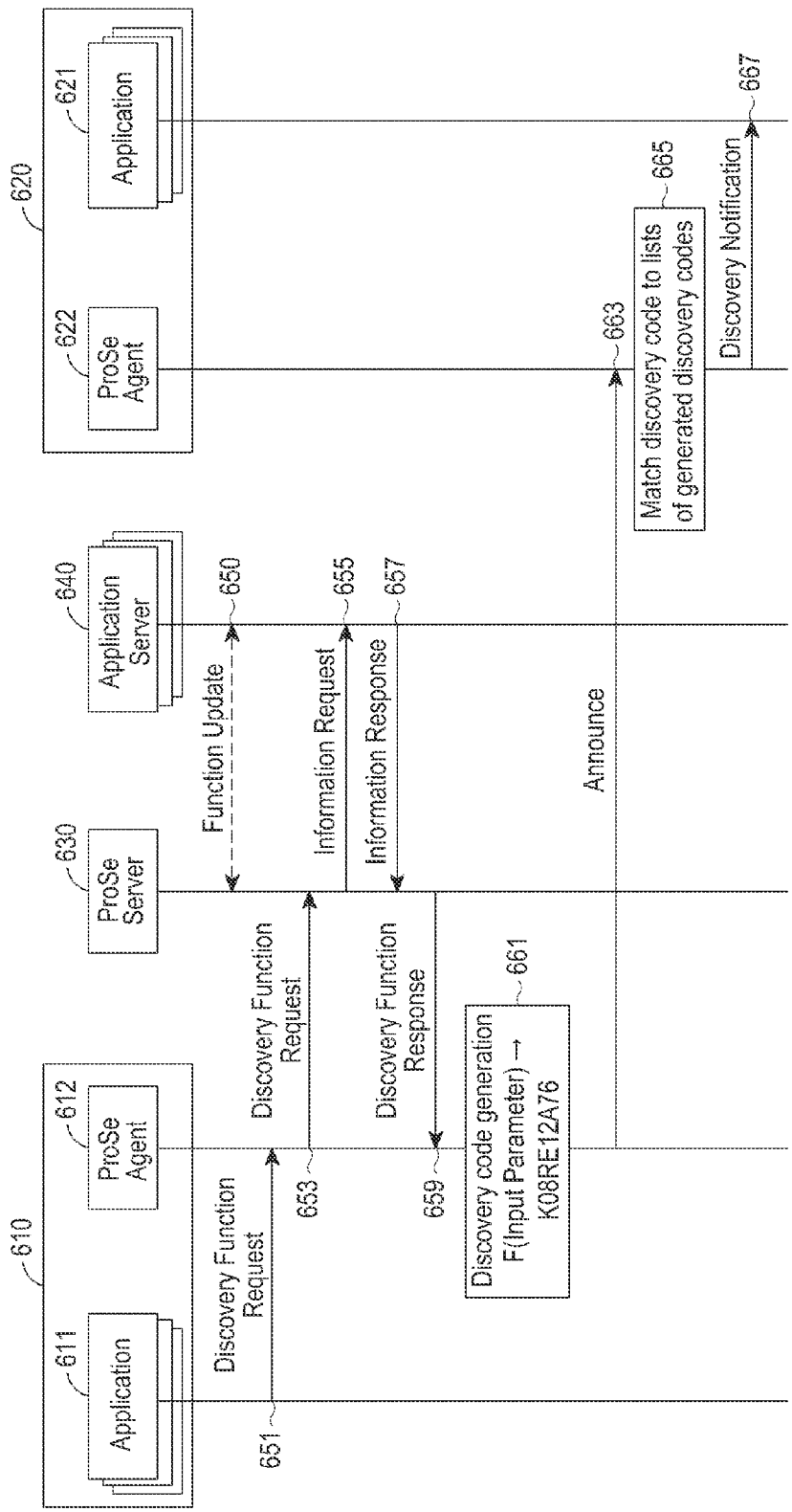
FIG. 5 illustrates a code allocation method for allowing discovery between D2D UEs having the same discovery information according to an embodiment of the present disclosure.

FIG. 5 illustrates a code allocation method for allowing discovery between D2D UEs having the same discovery information according to an embodiment of the present disclosure.

Referring to FIG. 5, in operation 650, an application server 640 may perform an update operation with a ProSe server 630. In operation 651, an application area 611 of a UE 610 may deliver application information including an ID of an authorized application downloaded from an operator (not shown) and its own ID 'My ID' to a ProSe agent 612 using a discovery function request message, to prepare to make a code needed for discovery. It will be assumed that an application has been created by a content provider, and then authorized and registered by the operator. The operator may assign an ID to the registered application and manage the application.

In operation 653, the ProSe agent 612 may transmit a discovery function request message to the ProSe server 630 to receive a code for discovery. The discovery function request message may include application information including My ID and Application ID. Thereafter, the ProSe server 630 may determine the validity of the application ID by verifying the application ID with the UE 610. If the application ID is valid, the ProSe server 630 may transmit the received application information to the application server 640 by including the application information in an information request message in operation 655. In operation 657, the application server 640 may transmit an input parameter for decrypting the message received from the ProSe server 630 and encoding related application information, to the ProSe server 630 by including the input parameter in an information response message.

Thereafter, in operation 659, the ProSe server 630 may allocate the function 'Function F( )' that the application uses for discovery, and transmit the allocated function to the UE 610 together with an input parameter related to 'My ID' using a discovery function response message. As an example, each of all applications may share the function for generating a discovery code, and the function may be under management of the operator. As another example, all applications may have one function, and the function may be under management of the operator. Upon receiving the function, the ProSe agent 612 of the UE 610 may generate a discovery code 'K08RE12A76' by inserting the My ID-related input parameter received from the ProSe server 630 into the function in operation 661. If the generated discovery code is used, UEs that use the same function and the same application may obtain application ID information by decrypting the discovery code. As yet another example, when finding a friend, the application area 611 may insert the friend's ID 'Friend ID' into a discovery function request message and send the discovery function request message, and the ProSe agent 612 may transmit the 'Friend ID' information to the ProSe server 630, and the information may be delivered to the application server 640, in which the information is converted into an input parameter and then delivered to the UE 610. The UE 610 may generate a new discovery code 'M73A1N90U8' by inserting the information into Function F( ). As yet another example, when desiring to find a group, the application area 611 may insert a friend's ID 'Friend ID' into a discovery function request message and send the discovery function request message, and the ProSe agent 612 may transmit the 'Friend ID' information to the ProSe server 630, and the information may be delivered to the application server 640, in which the information is converted into an input parameter and then delivered to the UE 610. The UE 610 may generate a new discovery code '25SA3S0N96' by inserting the information into Function F( ). Although only one type of information is used as an input of a discovery code generation function in the above examples, multiple types of information may be used. The above function may be an irreversible function that uses the result values. In other words, although a UE having the same information may make a discovery code by inserting the same input value, the UE may not obtain information about an input value even though the UE has a discovery code and a function.

If the generation of a discovery code is completed in the ProSe agent 612 of the UE 610 through this process, the ProSe agent 612 may participate in a discovery procedure by broadcasting the generated discovery code to nearby UEs in operation 663.

Even a ProSe agent 622 of a UE 620, like the ProSe agent 612 of the UE 610, may receive an application ID and My ID from an application area 621 using a discovery request message, the ProSe server 630 may determine the validity of the application ID by verifying the application ID, and the ProSe agent 622 may receive an input parameter from the ProSe server 630. Thereafter, as an example, if a command desiring to find a friend is transmitted to the ProSe agent 622 together with Friend ID using a discovery command message from the application area 621, the ProSe agent 622 may generate a discovery code '40I0SFAKDJ' by inputting Friend ID to Function F( ), and then store the generated discovery code. One or more discovery code lists may be made depending on the requirements of the application area. Thereafter, the ProSe agent 622 of the UE 620 may participate in the discovery procedure and listen to a discovery code from a nearby UE in operation 663. If the ProSe agent 622 finds a discovery code matching the discovery code included in the discovery code list stored therein in operation 665, the ProSe agent 622 may notify the application area 621 that the discovery codes are matched, using a match notification message in operation 667.

Figure 6:
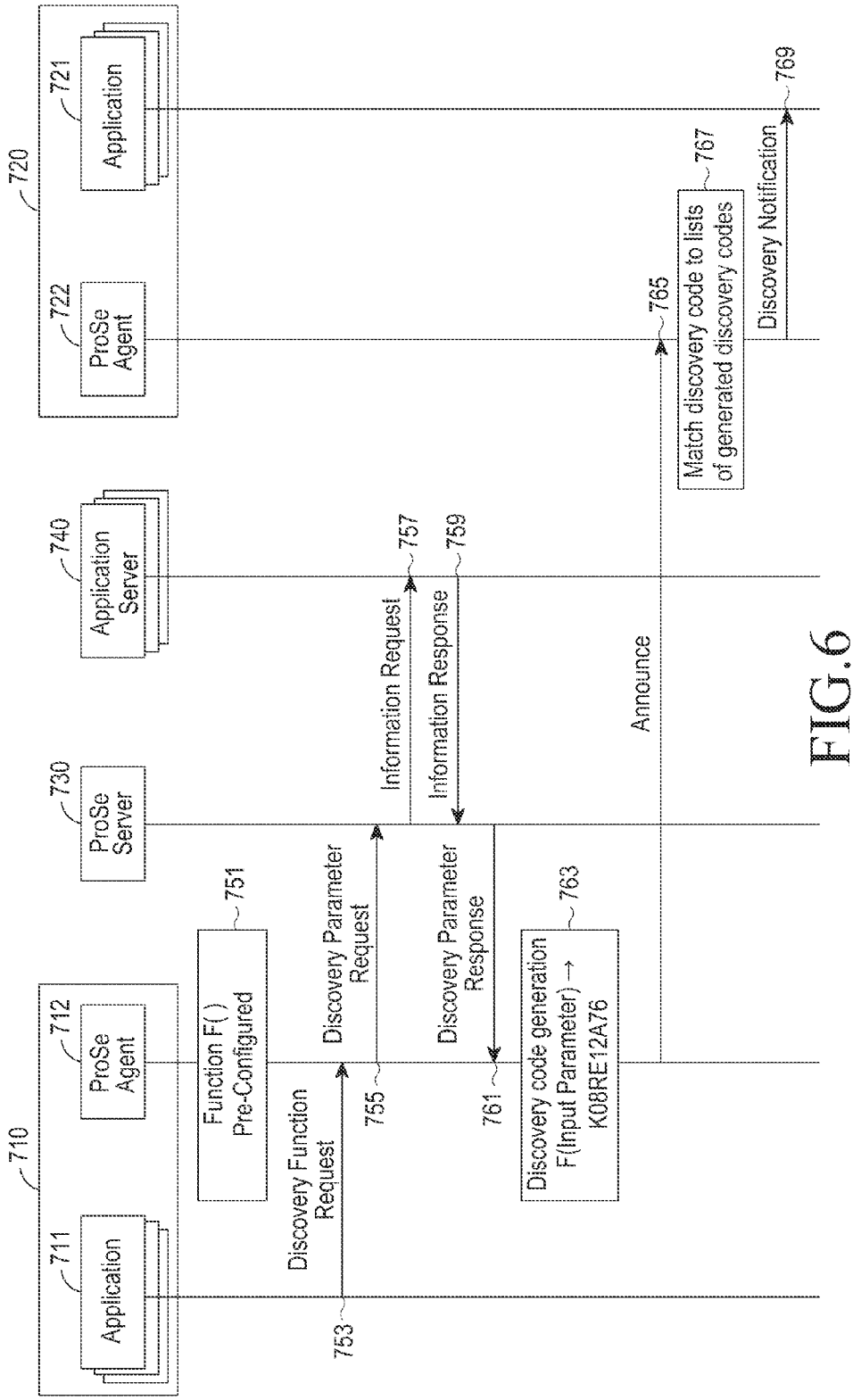
FIG. 6 illustrates a code allocation method for allowing discovery between D2D UEs having the same discovery information according to an embodiment of the present disclosure.

FIG. 6 illustrates a code allocation method for allowing discovery between D2D UEs having the same discovery information according to an embodiment of the present disclosure.

Referring to FIG. 6, in operation 753, an application area 711 of a UE 710 may deliver application information including its own ID 'My ID' and an ID of an authorized application downloaded from an operator (not shown) to a ProSe agent 712 using a discovery function request message, to prepare to make a code needed for discovery. In operation 751, the ProSe agent 712 may have in advance a function 'Function F( )' for making a discovery code. It will be assumed that an application has been created by a content provider, and then authorized and registered by the operator. The operator may assign an ID to the registered application and manage the application.

In operation 755, the ProSe agent 712 may transmit a discovery parameter request message to a ProSe server 730 to obtain information for generating a code for discovery. The discovery parameter request message may include application information including My ID and Application ID. Thereafter, the ProSe server 730 may determine the validity of the application ID by verifying the application ID with the UE 710. If the application ID is valid, the ProSe server 730 may transmit the received application information to an application server 740 by including the application information in an information request message in operation 757. In response, the application server 740 may transmit an input parameter for decrypting the information request message received from the ProSe server 730 and encoding related application information, to the ProSe server 730 by including the input parameter in an information response message, in operation 759.

Thereafter, in operation 761, the ProSe server 730 may transmit the input parameter to the UE 710 using a discovery parameter response message. As an example, each UE may have a function for generating a discovery code, and the function may be pre-configured, may be made by the operator and may be under management of the operator. Thereafter, in operation 763, the ProSe agent 712 of the UE 710 may generate a discovery code 'K08RE12A76' by inserting the received input parameter into the function. If the generated discovery code is used, UEs that use the same application information as that of the function used for the code generation may obtain application-related information by decrypting the discovery code. As another example, when finding a friend, the application area 711 may insert the friend's ID 'Friend ID' into a discovery function request message and send the discovery function request message, and the ProSe agent 712 may transmit the 'Friend ID' information to the ProSe server 730, and the information may be delivered to the application server 740, in which the information is converted into an input parameter and then delivered to the UE 710. The UE 710 may generate a new discovery code 'M73A1N90U8' by inserting the information into Function F( ). As yet another example, when desiring to find a group, the application area 711 may insert a friend's ID 'Friend ID' into a discovery function request message and send the discovery function request message, and the ProSe agent 712 may transmit the 'Friend ID' information to the ProSe server 730, and the information may be delivered to the application server 740, in which the information is converted into an input parameter and then delivered to the UE 710. The UE 710 may generate a new discovery code '25SA3S0N96' by inserting the information into Function F( ). Although only one type of information is used as an input of a discovery code generation function in the above examples, multiple types of information may be used. The above function may be an irreversible function that uses the result values. In other words, although a UE having the same information may make a discovery code by inserting the same input value, the UE may not obtain information about an input value even though the UE has a discovery code and a function.

If the generation of a discovery code is completed in the ProSe agent 712 of the UE 710 through this process, the ProSe agent 712 may participate in a discovery procedure by broadcasting the generated discovery code to nearby UEs in operation 765.

Even a ProSe agent 722 of a UE 720, like the ProSe agent 712 of the UE 710, may receive an application ID, My ID and Function F( ) from an application area 721 using a discovery request message, the ProSe server 730 may determine the validity of the application ID by verifying the application ID, and the ProSe agent 722 may receive an input parameter from the ProSe server 730. Thereafter, as an example, if a command desiring to find a friend is transmitted to the ProSe agent 722 together with Friend ID using a discovery command message from the application area 721, the ProSe agent 722 may generate a discovery code '40I0SFAKDJ' by inputting Friend ID to Function F( ), and then store the generated discovery code. One or more discovery code lists may be made depending on the requirements of the application area. Thereafter, the ProSe agent 722 of the UE 720 may participate in the discovery procedure and listen to a discovery code from a nearby UE in operation 765. If the ProSe agent 722 finds a discovery code matching the discovery code included in the discovery code list stored therein in operation 767, the ProSe agent 722 may notify the application area 721 that the discovery codes are matched, using a match notification message in operation 769.

FIG. 7 illustrates a code allocation method for allowing discovery between D2D UEs having the same discovery information according to an embodiment of the present disclosure.

Referring to FIG. 7, in operation 851, an application area 811 of a UE 810 may deliver an ID of an authorized application downloaded from an operator (not shown) to a ProSe agent 812 using a discovery function request message, to prepare to make a code needed for discovery. It will be assumed that an application has been created by a content provider, and then authorized and registered by the operator. The operator may assign an ID to the registered application and manage the application.

In operation 853, the ProSe agent 812 may transmit a discovery function request message to a ProSe server 830 to receive a code for discovery. The discovery function request message may include an application ID. Thereafter, the ProSe server 830 may determine the validity of the application ID by verifying the application ID with the UE 810. If the application ID is valid, the ProSe server 830 may allocate a function 'Function F( )' that the application uses for discovery, and transmit the allocated function to the UE 810 using a discovery function response message, in operation 855. As an example, each of applications may share the function for generating a discovery code, and the function may be under management of the operator. As another example, all applications may have one function, and the function may be under management of the operator. Upon receiving the function, the ProSe agent 812 of the UE 810 may generate a discovery code 'K08RE12A76' by inserting an ID of the application that transmitted the discovery function request message, into the function in operation 857. If the generated discovery code is used, UEs that use the same function and the same application may obtain application ID information by decrypting the discovery code.

Thereafter, the application area 811 may generate a code containing desired information by requesting the unique information. As an example, if only the people knowing an ID of the application area 811 desire to listen to a discovery signal of the application area 811, the application area 811 may insert its own ID 'My ID' information into a discovery command message and send the discovery command message in operation 859, and the ProSe agent 812 may transmit the 'My ID' information to the ProSe server 830 by inserting the 'My ID' information into a discovery parameter request message in operation 861. The ProSe server 830 may deliver this information to an application server 840 using an information request message in operation 863, and in response, the application server 840 may convert this information into an input parameter, and transmit the input parameter to the ProSe sever 830 using an information response message in operation 865. In operation 867, the ProSe server 830 may transmit the input parameter to the UE 810 using a discovery parameter response message. In operation 869, upon receiving the input parameter, the UE 810 may generate a new discovery code 'K032145122' by inserting the information into Function F( ). As yet another example, when finding a friend, the application area 811 may insert the friend's ID 'Friend ID' into a discovery command message and send the discovery command message, and the ProSe agent 812 may transmit the 'Friend ID' information to the ProSe server 830 by inserting the 'Friend ID' information into a discovery parameter request message. In response, the ProSe server 830 may deliver this information to the application server 840, in which the information may be converted into an input parameter. Upon receiving the input parameter, the UE 810 may generate a new discovery code by inserting the information into Function F( ). As yet another example, when desiring to find a group, the application area 811 may insert a group ID into a discovery command message and send the discovery command message, and the ProSe agent 812 may transmit the group ID information to the ProSe server 830 by inserting the group ID information into a discovery parameter request message. The ProSe server 830 may deliver this information to the application server 840, and in response thereto, the application server 840 may convert this information into an input parameter and transmit the input parameter to the UE 810. Upon receiving the input parameter, the UE 810 may generate a new discovery code by inserting the information into Function F( ). Although only one type of information is used as an input of a discovery code generation function in the above examples, multiple types of information may be used. The above function may be an irreversible function that uses the result values. In other words, although a UE having the same information may make a discovery code by inserting the same input value, the UE may not obtain information about an input value even though the UE has a discovery code and a function.

If the generation of a discovery code is completed in the ProSe agent 812 of the UE 810 through this process, the ProSe agent 812 may participate in a discovery procedure by broadcasting the generated discovery code to nearby UEs in operation 871.

Even a ProSe agent 822 of a UE 820, like the ProSe agent 812 of the UE 810, may receive an application ID from an application area 821 using a discovery function request message, the ProSe server 830 may determine the validity of the application ID by verifying the application ID, and the ProSe agent 822 may receive a discovery code generation function from the ProSe server 830. Thereafter, as an example, if a command desiring to find a friend is transmitted to the ProSe agent 822 together with Friend ID using a discovery command message from the application area 821, the ProSe agent 822 may transmit Friend ID to the ProSe server 830 using a discovery parameter request message. The information may be delivered to the application server 840, in which the information may be converted into an input parameter and then delivered to the UE 810. Thereafter, the UE 810 may generate a discovery code '40I0SFAKDJ' by inputting Friend ID to Function F( ), and store the generated discovery code. One or more discovery code lists may be made depending on the requirements of the application area. Thereafter, the ProSe agent 822 of the UE 820 may participate in the discovery procedure and listen to a discovery code from a nearby UE in operation 871. If the ProSe agent 822 finds a discovery code matching the discovery code included in the discovery code list stored therein in operation 873, the ProSe agent 822 may notify the application area 821 that the discovery codes are matched, using a discovery notification message in operation 875.

As described above, embodiments of the present disclosure may be provided in a form of program commands executable through various computer means and recorded in a non-transitory recording media readable by a computer. Here, the non-transitory recording media readable by a computer may include a program command, data file, data structure, and any combination thereof. In the meantime, the program command recorded in the non-transitory recording media may be one specially designed for the embodiments of the present disclosure or one disclosed in the art of computer software. The non-transitory recording media readable by a computer may include hardware devices specially designed to store and execute programs such as magnetic media (hard disk, floppy disk, and magnetic tape), optical media (Compact Disc-Read Only Memory (CD-ROM) and Digital Versatile Disc (DVD)), magneto-optical media (floptical disk), Read Only Memory (ROM), Random Access Memory (RAM), and flash memory. Further, the program command may include a high level language code executable by a computer having an interpreter as well as a machine language code provided by a complier. The hardware device may be configured with at least one software module to perform operations according to various embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing discovery for device-to-device (D2D) communication, the method comprising:
    transmitting, by a terminal, a discovery service request message for D2D communication including at least one of application information and group information for a proximity based service (ProSe) to a server, the application information being information on an application downloaded and used for discovery for D2D communication by the terminal, and the group information being information on a group in the application;
    receiving, from the server, a discovery service key delivery message including a discovery service key corresponding to the at least one of the application information and the group information for the ProSe;
    acquiring the discovery service key of the application by decrypting the discovery service key delivery message; and
    performing the discovery for D2D communication by encrypting a discovery code with the acquired discovery service key.

2. The method of claim 1, wherein if discovering terminals belong to the group, the method further comprising:
    generating a dedicated discovery key using the group information and the discovery service key; and
    performing discovery for D2D communication by encrypting the discovery code with the dedicated discovery key.

3. The method of claim 1, wherein if discovering information is associated with a specific application, the method further comprising:
    requesting information for generation of a dedicated discovery key to the server;
    receiving the information for generation of the dedicated discovery key from the server;
    generating the dedicated discovery key using the received information; and
    performing discovery for D2D communication by encrypting the discovery code with the dedicated discovery key.

4. The method of claim 1, further comprising:
    transmitting a discovery code generation function request message for D2D communication including the at least one of the application information and the group information for the ProSe to the server;
    receiving, from the server, a discovery code generation function response message including a discovery code generation function corresponding to the at least one of the application information and the group information for the ProSe; and generating the discovery code using the received discovery code generation function and the at least one of the application information and the group information for the ProSe.

5. At least one non-transitory processor readable medium storing a computer program of instructions configured to be readable by at least one processor for instructing the at least one processor to execute a computer process for controlling to perform a method, the method comprising:
transmitting, by a terminal, a discovery service request message for D2D communication including at least one of application information and group information for a proximity based service (ProSe) to a server, the application information being information on an application downloaded and used for discovery for D2D communication by the terminal, and the group information being information on a group in the application;
receiving, from the server, a discovery service key delivery message including a discovery service key corresponding to the at least one of the application information and the group information for the ProSe;
acquiring the discovery service key of the application by decrypting the discovery service key delivery message; and
performing the discovery for D2D communication by encrypting a discovery code with the acquired discovery service key.

6. A terminal for performing discovery for device-to-device (D2D) communication, the terminal comprising:
a transceiver configured to transmit and receive data;
a memory storing a plurality of applications, and
at least one processor configured to control to:
transmit a discovery service request message for D2D communication including at least one of application information and group information for a proximity based service (ProSe) to a server, the application information being information on an application downloaded and used for discovery for D2D communication by the terminal, and the group information being information on a group in the application,
receive, from the server, a discovery service key delivery message including a discovery service key corresponding to the at least one of the application information and the group information for the ProSe,
acquire the discovery service key of the application by decrypting the discovery service key delivery message, and
perform the discovery for D2D communication by encrypting a discovery code with the acquired discovery service key.

7. The terminal of claim 6, wherein, if discovering terminals belong to the group, the at least one processor is further configured to control to:
generate a dedicated discovery key using the group information and the discovery service key, and
perform discovery for D2D communication by encrypting the discovery code with the dedicated discovery key.

8. The terminal of claim 6, wherein, if discovering information is associated with a specific application, the at least one processor is further configured to control to:
request information for generation of a dedicated discovery key to the server upon receiving a request for discovery for information associated with a specific application,
generate the dedicated discovery key using information for generation of the dedicated discovery key that the terminal has received from the server in response to the request, and
perform discovery for D2D communication by encrypting the discovery code with the dedicated discovery key.

9. The terminal of claim 6, wherein the at least one processor is further configured to control to:
transmit to the server a discovery code generation function request message including the at least one of the application information and the group information for the ProSe,
receive from the server a discovery code generation function response message including a discovery code generation function corresponding to the at least one of the application information and the group information for the ProSe,
receive a discovery command, and
generate the discovery code using the information included in the discovery command and the received discovery code generation function and the at least one of the application information and the group information for the ProSe.

10. The method of claim 1, wherein the discovery code is generated and transmitted to the terminal by the server.

11. The method of claim 1, wherein the discovery code is generated by the terminal using a discovery code generation function stored at the terminal.

12. The method of claim 4, wherein the discovery code generation function is an irreversible function.

13. The method of claim 4,
wherein the discovery code generation function response message further comprises an input parameter of the discovery code generation function, and
wherein the generating of the discovery code comprises generating the discovery code using the discovery code generation function and the input parameter.

14. The terminal of claim 6, wherein the discovery code is generated and transmitted to the terminal by the server.

15. The terminal of claim 6, wherein the discovery code is generated by the terminal using a discovery code generation function stored at the terminal.

16. The terminal of claim 9, wherein the discovery code generation function is an irreversible function.

17. The terminal of claim 9,
wherein the discovery code generation function response message further comprises an input parameter of the discovery code generation function, and
wherein the ProSe agent is configured to generate the discovery code using the discovery code generation function and the input parameter.

* * * * *